US012398851B2

(12) United States Patent
Illueca Bel

(10) Patent No.: US 12,398,851 B2
(45) Date of Patent: Aug. 26, 2025

(54) LIGHTING SYSTEM WITH A CONTINUOUS FLEXIBLE TRACK

(71) Applicant: ANTARES ILUMINACIÓN, S.A.U., Valencia (ES)

(72) Inventor: Pablo Miguel Illueca Bel, Valencia (ES)

(73) Assignee: ANTARES ILUMINACIÓN, S.A.U., Valencia (ES)

( * ) Notice: Subject to any disclaimer, the term of this patent is extended or adjusted under 35 U.S.C. 154(b) by 0 days.

(21) Appl. No.: 18/719,555

(22) PCT Filed: Nov. 16, 2022

(86) PCT No.: PCT/EP2022/082084
§ 371 (c)(1),
(2) Date: Jun. 13, 2024

(87) PCT Pub. No.: WO2023/110266
PCT Pub. Date: Jun. 22, 2023

(65) Prior Publication Data
US 2025/0052385 A1 Feb. 13, 2025

(30) Foreign Application Priority Data
Dec. 14, 2021 (ES) .................................. 202131156

(51) Int. Cl.
*F21S 8/06* (2006.01)
*F21V 21/005* (2006.01)

(52) U.S. Cl.
CPC ........... *F21S 8/066* (2013.01); *F21V 21/005* (2013.01)

(58) Field of Classification Search
CPC .............................. F21S 8/066; F21V 21/005
USPC ........................................................ 362/648
See application file for complete search history.

(56) References Cited

U.S. PATENT DOCUMENTS

| | | | |
|---|---|---|---|
| 5,672,003 A | 9/1997 | Shemitz et al. | |
| 6,716,042 B2 * | 4/2004 | Lin ........................ | H01R 25/14 362/147 |
| 7,654,834 B1 | 2/2010 | Mier-Langner et al. | |
| 10,619,834 B2 * | 4/2020 | Martinez Weber ... | F21V 23/001 |
| 2005/0231947 A1 | 10/2005 | Sloan et al. | |
| 2007/0015388 A1 * | 1/2007 | Boike .................. | H01R 33/945 439/121 |

(Continued)

FOREIGN PATENT DOCUMENTS

| | | |
|---|---|---|
| EP | 3388743 A1 | 10/2018 |
| WO | 2016132362 A1 | 8/2016 |

*Primary Examiner* — Laura K Tso
(74) *Attorney, Agent, or Firm* — Hayes Soloway P.C.

(57) ABSTRACT

The present invention relates to a lighting system with a continuous flexible track comprising a plurality of brackets that are attached to a facing; a track formed by a body that is flexible and generates a continuous longitudinal shape without cuts or joints, wherein the track is attached by pressure to the brackets; at least one flexible lateral plate arranged on each side of the track, having a tongue-and-groove connection for connecting by pressure with said track, and comprising at least one electrical conductor; and adapters, which are attached by pressure in a lower slot arranged in the track, and which comprise at least one luminous device, wherein said adapters comprise an electrical contact that coincides in location with the electrical conductor and, therefore, that supplies the luminous devices with electrical power.

15 Claims, 5 Drawing Sheets

(56) References Cited

U.S. PATENT DOCUMENTS

| | | | | |
|---|---|---|---|---|
| 2007/0091596 | A1 | 4/2007 | Grossman et al. | |
| 2007/0153550 | A1 | 7/2007 | Lehman et al. | |
| 2010/0061095 | A1 | 3/2010 | Hoffmann | |
| 2018/0313503 | A1 * | 11/2018 | Sonneman | F21V 23/06 |
| 2020/0326047 | A1 | 10/2020 | De Bevilacqua et al. | |
| 2023/0349522 | A1 * | 11/2023 | Hierzer | F21S 8/066 |

* cited by examiner

LIGHTING SYSTEM WITH A CONTINUOUS FLEXIBLE TRACK

CROSS-REFERENCE TO RELATED APPLICATIONS AND PRIORITY

This patent application claims priority from PCT Application No. PCT/EP2022/082084 filed Nov. 16, 2022, which claims priority from Spanish Patent Application No. P202131156 filed Dec. 14, 2021. Each of these patent applications are herein incorporated by reference in their entirety.

FIELD OF THE INVENTION

The present invention consists of a lighting system that is made up of a flexible track, wherein the track is attached to any type of facing and comprises a plurality of luminous devices or luminaires arranged along the length thereof. This invention allows the generation of various linear shapes and has the advantage, compared to any known lighting system, that the track allows the flexible track of the electrical power supply system to be made independent from the different luminous devices, it allows the track to be removed in a simple way without the need to disassemble the attachment anchors for attaching to the facing and, in addition, it allows the luminaires to be located and/or removed as required by the user without the assembly being affected.

This invention falls within the different types of lighting equipment and systems, and more specifically, within the systems comprising flexible tracks.

STATE OF THE ART

It is widely known within this industrial sector the existence of lighting systems comprising a track that supplies electrical energy to a plurality of luminaires or luminous devices. The present invention focusses on the type of lighting systems wherein the electric track has the particularity of being flexible and, therefore, allows the generation of longitudinal configurations with shapes other than linear ones.

The usual lighting systems are based on fixed tracks, wherein the track can have sections of various configurations, but in all known cases, the power supply wiring is comprised within the fixed structure of the track. In this sense, that which is disclosed in document WO2016132362A1 is known, where in addition to this previous feature, the lighting system has a lower configuration comprising a longitudinal track where a luminaire can be fitted. This type of system has the advantage that it allows a user to attach luminous devices at different points of the track, however, it does not allow the generation of various continuous linear shapes, and in the event of having to do any type of maintenance or replacement work, it requires that the entire system has to be removed, since all the elements of the system are linked to the fixed track.

That which is disclosed in document U.S. Pat. No. 5,672,003A is also known, wherein a lighting system with a modular fixed track is described, with embeddings and fixed brackets that shelter the track from the facing, and which comprises internal tracks with an electrical wiring housed within the cross section thereof wherein luminous devices are attached with an adapter with a special configuration that allows the electrical connection with the internal wiring in the track. This document, like the previous one, does not generate systems with various continuous linear shapes, and in the event of maintenance or replacement, it requires the entire system to be removed.

Within the systems that comprise a flexible track, systems are known having a track with a tubular configuration, intended to house a continuous luminous device or continuous lighting strip inside it and, therefore, the electrical power supply of the system is comprised in the lighting strip itself housed within the closed cross section of the track. By way of example, that which is disclosed in documents US2005231947A and US2010061095A1 is known. These systems have the advantage of being able to generate diverse linear shapes, but they have the problem that the closed configuration does not allow the location of punctual lamp holders, but only allows the installation of a continuous strip; and they have the problem that they require an embedding or attachment to the facing that does not allow their removal without disassembling the entire system.

That which is disclosed in document EP3388743A1 is also known, wherein a lighting system is described with a flexible track with an open configuration, specifically formed by a double T section, and which houses a luminaire on at least one of the lateral faces thereof, which in this case is an LED strip. This alternative solves the problem of being able to configure a non-linear system, but requires an embedding or attachment to the facing that does not allow it to be removed without disassembling the entire system, and being an open track, it does not allow it to be used for any other use than the assembly of luminaires, even in this case, it does not allow the location of punctual lamp holders but only allows the installation of a continuous strip.

Finally, that which is described in document US2007091596A1 is known, which discloses a modular lighting system made up of rigid and flexible tracks assembled and attached to each other by means of coupling means at each end of each track, and comprising fluorescent lamps assembled inside adjustable accessories. These tracks are attached to a facing which, for example, can be interpreted as a ceiling. For the electrical connection between the tracks and the luminaires, flexible power cables are required that are integrated within the tracks with tongue-and-groove connections between the different track sections, and with a connection to the luminaires by means of standardised adapters attached to the tracks. In this sense, it is not a viable technique to leave multiple free adapters in the event that different luminaires are to be located, due to both aesthetic and/or economic reasons, as well as due to a technical aspect wherein complex adapters are required. The system proposed in document US2007091596A1 solves the problem of being able to configure a non-linear system, although not continuously, which implies connectors in each section; but it has the problems that it requires an embedding or attachment to the facing that does not allow the removal thereof without disassembling the entire system, or at least entire sections of both track and electrical wiring, and it also has the problem that it does not allow the location of punctual lamp holders but only allows the installation of a device in the fixed couplings, leaving multiple couplings free for this purpose not being viable.

Taking into account all the arguments previously exposed, it is considered that there is no solution to the technical problem of being able to have a lighting system that can have a continuous non-linear configuration that allows luminous devices to be punctually located at any point along the length thereof, the electric track not being attached to the facing and, therefore, said track being able to be disassembled in a simple way in the event that it is required.

In this sense, and taking into account the known background in the state of the art, wherein the flexible tracks are tubular and serve to house and protect the luminaire, or open with all the elements of the system integrated in the track, this being non-continuous; the present invention not only differs in the structure and configuration thereof from any other known in the state of the art, but also overcomes the previously described problems through the development of an attachment means for attaching to the facing that is independent from the track, which means that it is not required that the track is attached to the facing, which allows the track to be easily and quickly assembled or removed; and comprises elements outside the cross section of the track that house the power supply, so that the luminous devices are arranged in any location on the track and, furthermore, if electrical maintenance work is to be carried out, there is no need to remove the track, but only the independent element that houses said electrical connection wiring.

DESCRIPTION OF THE INVENTION

The object of the present invention is a lighting system with which various linear shapes are generated due to a track that allows a luminous device to be attached at any point, and which has the particularity of having a configuration such that the track can be easily removed without the need to disassemble the attachment anchors for attaching to the facing; and it has flexible profiles on the sides of the track, which are elements that are independent from the track itself, which house the power supply wiring, and with which the power supply is made independent from the track itself, and with which the problem is solved in the event that maintenance or repair tasks on the electrical wiring are to be carried out, or even to increase or decrease the electrical wiring, of not having to remove the track, but only that independent portion of the system, which represents an important advantage over known systems where the entire system has to be removed.

In this sense, the present lighting system, which is attached to a facing, preferably a ceiling, is made up of a plurality of brackets that are attached to the facing; a track formed by an extrusion body made of polymeric material, comprising an upper opening that allows it to be attached by pressure to the brackets, wherein the track is flexible and allows the generation of a longitudinal shape with curves and straight lines continuously and without cuts or joints, and comprising a lower slot that allows at least one adapter of a luminous device to be attached therein by pressure; at least one flexible lateral plate, which is an extruded profile formed from a polymer material, which is attached by pressure on at least one side of the track and wherein these plates comprise at the lower portion of the internal face thereof, which protrudes from the track when the plate is attached, lips or a spigot that protect at least one electrical conductor made of copper; and a plurality of luminous devices comprised in an adapter, wherein the adapter is attached to the electrical track by pressure and which comprises on one of the lateral faces thereof at least one electrical connection that is in contact with an electrical conductor of at least one of the lateral plates, so that the adapter is attached to the track, but the power supply is facilitated by the contact thereof with at least one of the lateral plates of the track.

Going into greater detail of the invention, the system comprises a track which, as has been mentioned, is an extruded body made of flexible material of a polymeric nature having a hollow configuration that allows it to be attached by pressure to the fixed brackets of the facing, which means that the track can be easily removed by the user by pressing the track and removing it from the brackets, which provides the advantage of easy assembly and disassembly; and a lower slot where an adapter that houses at least one luminous device can be attached by pressure. Therefore, it can be indicated that a section of the track is such that it comprises:

- at least one upper opening for the attachment with the fixed brackets,
- tongue-and-groove connection means on at least one of the sides, whether they are recesses and/or projections;
- at least one lower slot for attaching with adapters comprising luminous devices.

Preferably, but in a non-limiting manner, the lateral contours of the cross section of the track are straight, adopting solid quadrangular shapes; however, the lateral contours or sides can adopt curved shapes as long as they have the tongue-and-groove connection means, so that said curved shapes can generate more attractive and unique visual shapes.

In a possible embodiment of the invention, in order to improve the general resistance of the flexible track, this track can be a coextrusion body with a flexible polymer with at least one layer of rigid polymer arranged in the portion of the upper opening that remains in contact with the fixed brackets.

Moreover, the brackets that are attached to the facing are such that they comprise:

- a lower plate, which is in contact with the facing; wherein the plate can have a plurality of through holes for the attachment elements for attaching to the facing; and
- at least one head, which protrudes from the plate, which, in the event of having holes, is arranged in the space between holes, wherein this head has a male-like configuration that allows it to fit by pressure in the upper opening of the track.

These brackets are parts that can have different radii and lengths, and are joined linearly to each other, generating free shapes attached to the facing, for example, to the ceiling, and therefore serve as a guide and support for the flexible electrical track. These brackets also provide the advantage that in the event that it is required to change the track or access the inside of the track, there is no need to disassemble the entire system, but simply remove the track from said brackets.

In order for these brackets to be linearly connected, connection means are arranged at the ends of each bracket, preferably being tongue-and-groove connection means. In a possible embodiment of the invention, at each end of a bracket there is both a male projection and a female recess, in such a way that they allow the coupling of the analogous tongue-and-groove means of the following bracket, and thus respectively with the following brackets, being able to generate a longitudinal guide with interconnected curves and straight lines as may be required by a user or an installation and, in addition, to serve as a bracket for the flexible track.

As previously indicated, the head has a male-like shape that allows it to fit by pressure in the upper opening of the track. In a possible embodiment of the invention, this shape is hook-like, that is, a head made up of a vertical reinforcement, from which at least one lateral flange starts on each side of said reinforcement, said flanges being hooked on the internal portion of the upper opening, which, in this case, requires a horizontal contact surface with said flange. In another possible embodiment of the invention, the head can be ball-shaped, i.e., made up of a vertical reinforcement comprising a rounded configuration at the end thereof, in which case, the internal portion of the upper opening can have either a horizontal surface as previously indicated, or a curved internal surface that allows better contact and attachment between both elements.

In addition, each flexible lateral plate is an extruded laminar body of a polymeric nature comprising:

- tongue-and-groove connection means on the internal face of the plate that allow fixing by pressure on the side of the track, whether they are recesses and/or projections;
- a height greater than the cross section of the track, so that it has a longitudinal projection along the entire length of the track, wherein on the internal face of the projection there is at least one spigot, preferably U-shaped, which houses an electric conductor made of copper.

Preferably, but in a non-limiting manner, the plate has straight faces, which adapt to the straight shape of the lateral faces of the track; however, these faces can adopt curved shapes as long as they can be adapted to the curved shapes of the sides of the track.

Finally, the system comprises a plurality of luminous devices, for example, LED spotlights, which are comprised in the structure of an adapter, wherein the adapter is fixed by pressure to the lower slot of the track, and on at least one of the lateral faces thereof there is an electrical connection that is in contact with an electrical conductor of at least one of the lateral plates. In this sense, an adapter is made up of:

- a base, which is a body comprising at least one electrical contact arranged on at least one of the sides of the base, which coincides with the location of the copper conductors arranged on the flexible lateral plates;
- a head, located on the base, which is preferably T-shaped, which is fixed by pressure in the lower longitudinal slot of the track;
- an electrical connection between the electrical contact and at least one lamp holder located in the body of the adapter; and
- a luminous device that is attached in each lamp holder of the adapter.

In the case of the adapter, this can be made of any resistant material such as, for example, of a plastic, polymeric, metallic nature or a mixture of several of them. In the same way, the luminous device that is installed in the lamp holder of the adapter is not intended to be limiting, but can be an LED device, a halogen device, a fluorescent device, or any other type of commercial luminous device.

With this structure, in case there is a problem with a copper cable, it is not required to remove the attachment bracket, nor the flexible track, nor the opposite plate comprising the conduction without problems, nor even the luminous adapter. It is only required to remove the plate having said problem by pressure.

In the same way, in the event that once the flexible track has been installed, the installation of luminous devices that require a greater electrical supply with more electrical conductions is required, and which may require a larger adapter, it is only required to remove the lateral plates and locate others with a greater height and which may comprise more conductions, as required by this new installation, and all this without having to remove the continuous flexible track. These problems, which are recurrent in the assembly of many electrical installations, are not contemplated by any type of known lighting system, and generate the problem of having to remove the entire set of elements of the already assembled system to have to, either repair a portion of the conduction, or the total system in the event of having to modify the installation variables.

Another aspect of these plates to take into account is that the external face, whether straight or curved, is a surface that can comprise at least one printout, wherein it can be printed directly in the factory on the same face as required by the user, or that the face can serve as a support for the bonding or adherence of a sheet or vinyl already printed. Therefore, the system can carry a printout either by way of advertising or showing a logo, unique colour, or any other printout that can make the product unique. This fact means that the present system, once the brackets, the track and the luminaires have been installed, in the event that it is required to change the external corporate colour or place an advertisement, it only requires to remove and change the external plate, which is an element independent from the rest of the elements of the system, which, in turn, is an advantage that is not possible to achieve with the lighting systems known in the state of the art where the entire system has to be changed.

It should be noted that, throughout the description and claims, the term “comprises” and its variants are not intended to exclude other technical features or additional elements.

BRIEF DESCRIPTION OF THE FIGURES

In order to complete the description and to help a better understanding of the features of the invention, a set of figures and drawings is presented wherein the following is represented by way of illustration and not limitation.

DETAILED DESCRIPTION OF AN EMBODIMENT OF THE INVENTION

Figure 1:
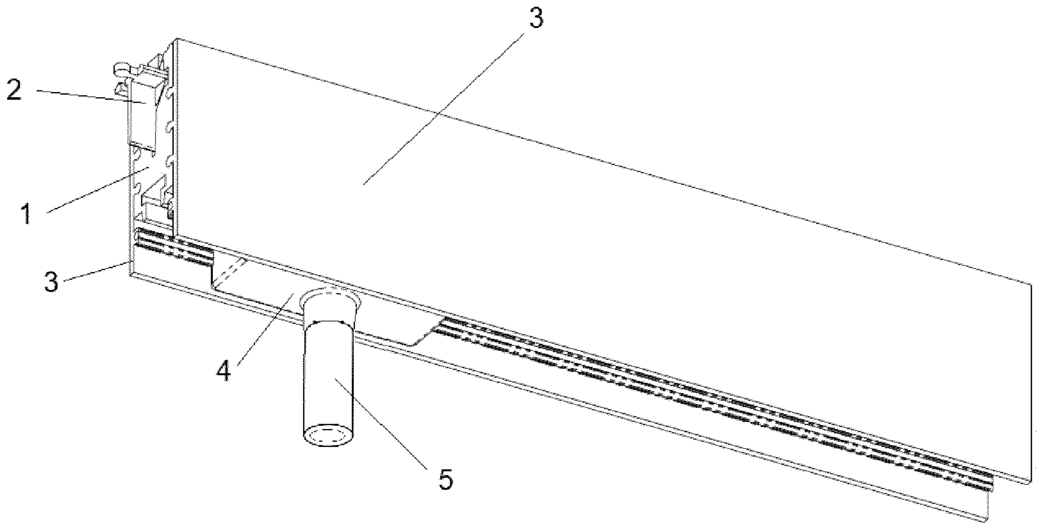
FIG. 1 shows a perspective view of the lighting system of the present invention.
Figure 2:
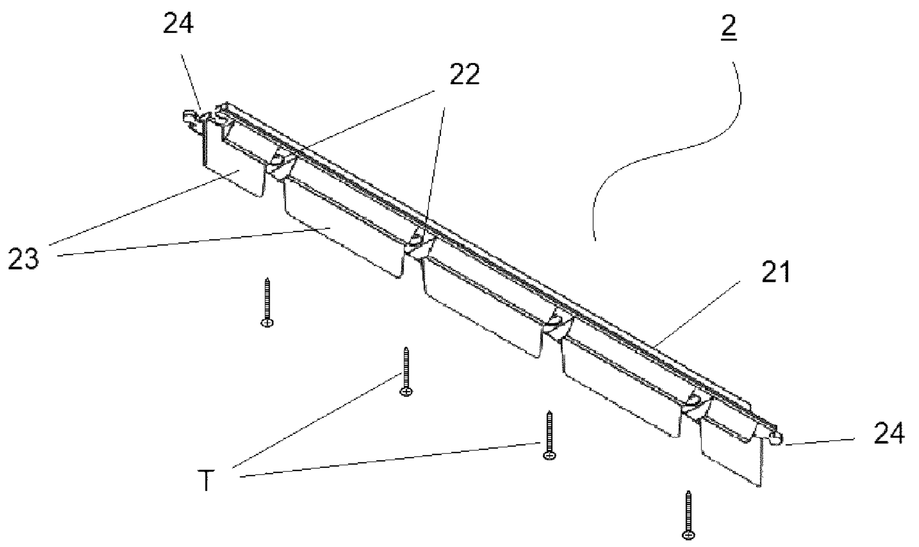
FIG. 2 shows a perspective view of an attachment bracket for attaching to the facing.

As can be seen in the previous set of figures, a possible embodiment of the invention, the lighting system that is attached to a ceiling is made up of a plurality of brackets (2) that are attached to the ceiling; a track (1) with an upper opening that allows it to be attached by pressure to the brackets (2), wherein the track is flexible and allows the generation of a longitudinal shape with curves and straight lines continuously and without cuts or joints; two lateral plates (3) that are attached to both sides of the track (1) by pressure, and wherein each plate comprises an electrical conduction; and at least one luminous device (5) comprised in an adapter (4), wherein the adapter is attached to the track (1) by pressure.

In this sense, the track (1) is a body of a polymeric nature comprising:

- an upper opening (11) for attaching with the fixed brackets;

tongue-and-groove connection means (12) on each side, which in the case of this embodiment are recesses;

a lower slot (13) for attaching at least one adapter (4) comprising a luminous device (5).

As can be seen in the figures, this embodiment of the invention is based on a track (1) with straight contours by way of a rectangular track.

Figure 3:
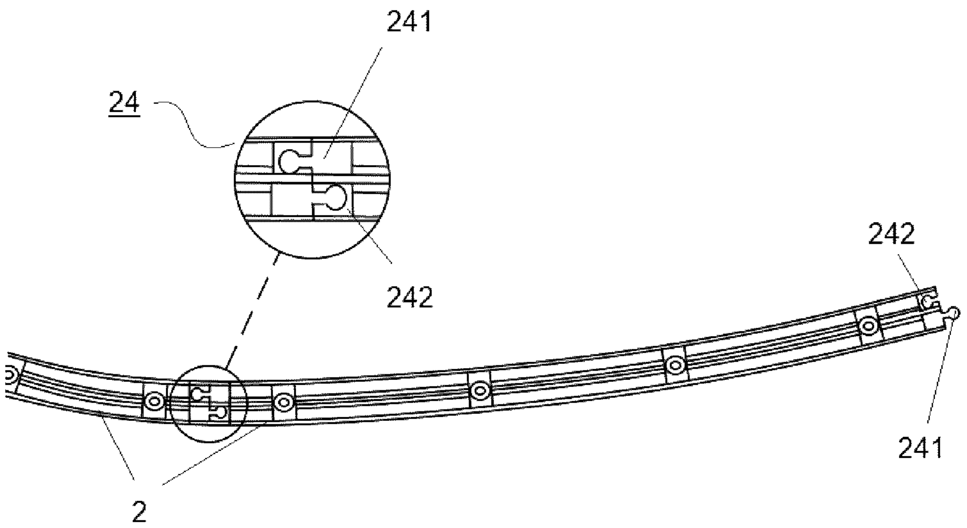
FIG. 3 shows a plan view showing a series of linearly connected brackets generating a curved shape.
Figure 4:
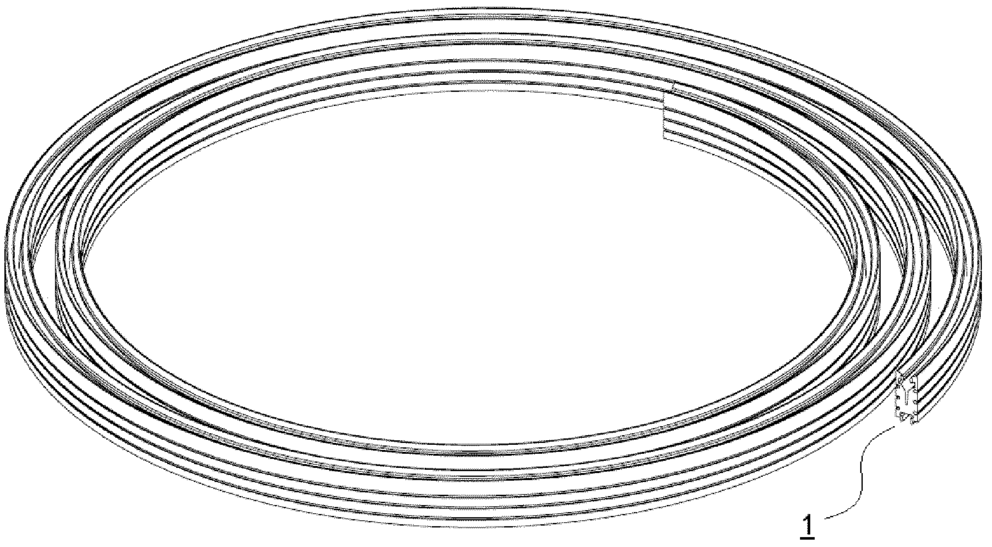
FIG. 4 shows a perspective view of a rolled flexible track.
Figure 5:
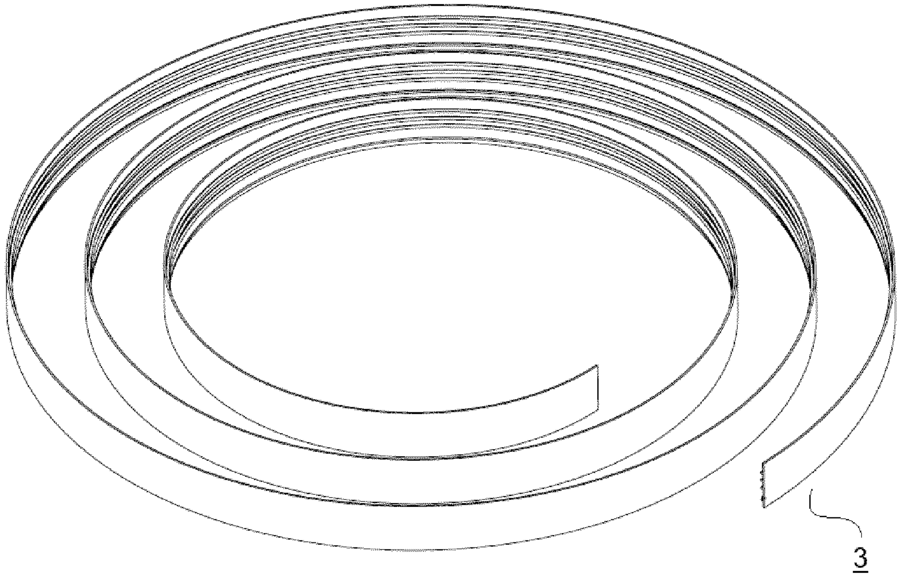
FIG. 5 shows a perspective view of a rolled flexible plate.
Figure 6:
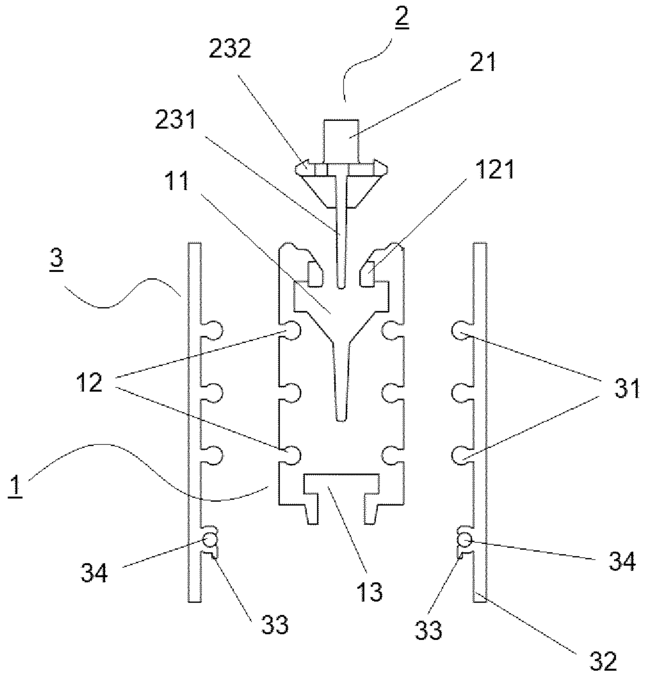
FIG. 6 shows a cross-sectional view of the way in which the track fits into the bracket by pressure, and lateral plates on each side of the track.
Figure 7:
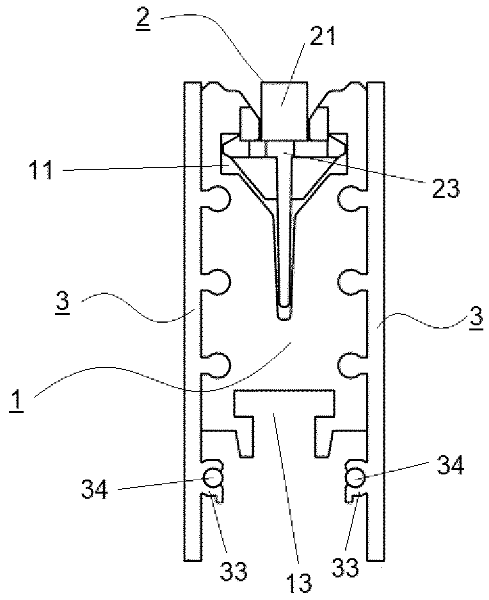
FIG. 7 shows a cross-sectional view of the pressure fit between the track and bracket, and the plates and the track.
Figure 8:
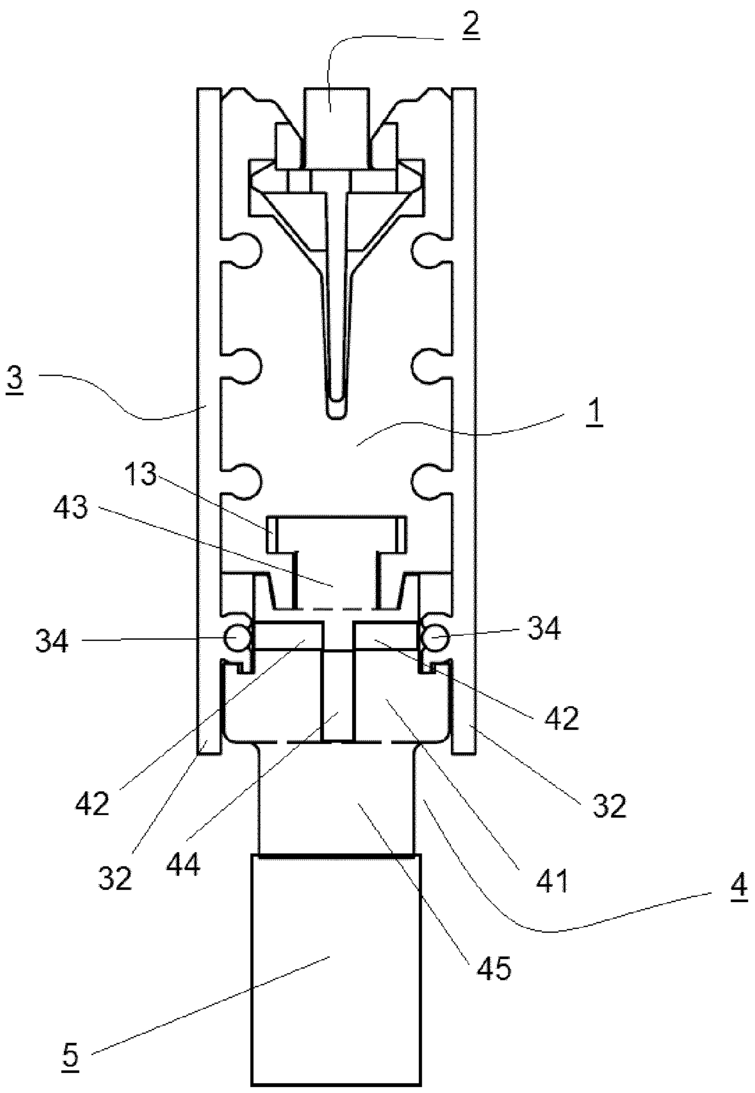
FIG. 8 shows a cross-sectional view of the coupling between all the elements of the lighting system of the present invention.

Moreover, a possible embodiment of a bracket (2) that is attached to the ceiling, as can be seen for example in FIG. 3, is a part comprising:

a lower plate (21), which is in contact with the ceiling; wherein the plate has a plurality of through holes (22) for the attachment screws (T) for attaching to the ceiling; and at least one head (23), which protrudes from the plate, which is arranged in the space between holes, wherein this head has a male-like configuration that allows it to fit by pressure in the upper opening (11) of the track, wherein in this case, a head is made up of a vertical reinforcement (231), from which a lateral flange (232) starts on each side of said reinforcement, said flanges being hooked on the internal portion of the upper opening, which, in this case, has horizontal stops (121) in contact with said tabs, and where this horizontal contact stop (121) arranged in the portion of the upper opening with the head (23) of the fixed bracket is made of a layer of rigid polymer.

As can be seen, mainly in FIG. 3, these brackets (2) are parts that can have different radii and lengths, and that are joined linearly to each other, generating free shapes attached to the ceiling. In this sense, in order for these brackets (2) to be linearly connected, tongue-and-groove connection means (24) are arranged at the ends of each bracket. In this embodiment of the invention, at each end of a bracket there is both a male projection (241) and a female recess (242), in such a way that they allow the coupling of the analogous tongue-and-groove means of the following bracket, and thus successively until generating a longitudinal guide with inter-connected curves and straight lines as may be required by a user or an installation, and which serves as a bracket for the track (1).

For its part, each lateral plate (3), which is flexible and is an extruded laminar body of a polymeric nature, which is an element independent from the track, and which comprises:

tongue-and-groove connection means (31) on the internal face of the plate that allows attachment by pressure on the side of the track, in the case of this embodiment being projections, which fit by pressure in the tongue-and-groove means (12) of the track which are recesses;

a height greater than the cross section of the track, so that this difference in height generates a longitudinal projection (32) along the entire length of the track, wherein on the internal face of the projection there is at least one spigot (33), in the case of the present embodiment, a U-shaped spigot, which houses an electrical conductor (34) made of copper.

As can be seen in the figures, this embodiment of the invention is based on a lateral plate (3) with straight sides so that it adapts to the straight contour of the sides of the rectangular track.

Finally, the system comprises a plurality of luminous devices (5) that are comprised in the structure of an adapter (4), wherein the adapter is attached by pressure to the lower slot (13) of the track (1); and wherein the adapter is made up of:

a base (41), which is a body comprising an electrical contact (42) arranged on at least one of the sides of the base, which is in contact and coincides with the location of the electrical conductors (34) made of copper that are arranged on the flexible lateral plates;

a head (43), located on the base, which is attached by pressure in the lower longitudinal slot (13) of the track;

an electrical connection (44) between the electrical contacts (42) and at least one lamp holder (45) located in the lower portion of the adapter base; and a luminous device (5) that is attached in each lamp holder of the adapter.

The invention claimed is:

1. A lighting system with a continuous flexible track, comprising a plurality of brackets that are attachable to a facing, a track formed by a body that is flexible and generates a continuous longitudinal shape; and at least one luminous device that is coupled to the track, wherein:

the track is a body with a section comprising at least one upper opening for the track to be connected by pressure with at least one head arranged on each fixed bracket; a tongue-and-groove connection arranged on at least one of the sides; and at least one lower slot for attaching at least one adapter comprising said at least one luminous device;

at least one flexible lateral plate, comprising a tongue-and-groove connection on an internal face of the plate for attachment by pressure in the tongue-and-groove connection on the sides of the track; plate having a height greater than the cross section of the track, wherein that difference in height generates a projection, and wherein on an internal face of the projection at least one electrical conductor is arranged; and wherein each adapter comprises at least one electrical contact that is in contact with at least one electrical conductor.

2. The lighting system, according to claim 1, wherein the track is an extruded body of a polymeric nature.

3. The lighting system, according to claim 1, wherein the lateral plate is an extruded laminar body of a polymeric nature.

4. The lighting system, according to claim 1, wherein the electrical conductor is protected in a spigot.

5. The lighting system, according to claim 4, wherein the spigot is U-shaped.

6. The lighting system, according to claim 1, wherein the track comprises at least one layer of rigid polymer arranged in the portion of the upper opening that acts as a horizontal stop with the head of the fixed bracket.

7. The lighting system, according to claim 1, wherein the cross section of the track is formed by straight sides.

8. The lighting system, according to claim 1, wherein the faces of the lateral plates are planar.

9. The lighting system, according to claim 1, wherein the faces of the lateral plates are curved.

10. The lighting system, according to claim 1, wherein each bracket comprises a lower plate for contact with the facing; and wherein the head fits by pressure in the upper opening of the track protruding from said lower plate.

11. The lighting system, according to claim 10, wherein the lower plate comprises a plurality of through holes for attachment screws for attaching to the facing.

12. The lighting system, according to claim 11, wherein a head is arranged in the space between two holes.

13. The lighting system, according to claim 10, wherein the brackets comprise a tongue-and-groove connection at the ends thereof.

14. The lighting system, according to claim 1, wherein the adapter comprises a base with at least one electrical contact arranged on at least one of the sides of the base; a head, located on the base, which is attached by pressure in the lower longitudinal slot of the track; at least one lamp holder located in the lower portion of the base of the adapter; and a luminous device that is attached in each lamp holder of the adapter.

15. The lighting system, according to claim 14, wherein the adapter comprises an electrical connection between the electrical contacts and the lamp holder.

* * * * *